United States Patent
Parivar et al.

(10) Patent No.: US 9,740,268 B2
(45) Date of Patent: Aug. 22, 2017

(54) INTELLIGENT MANAGEMENT FOR AN ELECTRONIC DEVICE

(71) Applicant: Apple Inc., Cupertino, CA (US)

(72) Inventors: Nima Parivar, South San Francisco, CA (US); Kelsey Y. Ho, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 14/598,044

(22) Filed: Jan. 15, 2015

(65) Prior Publication Data

US 2015/0130739 A1  May 14, 2015

Related U.S. Application Data

(62) Division of application No. 12/852,056, filed on Aug. 6, 2010, now abandoned.

(51) Int. Cl.
| | |
|---|---|
| *G06F 9/46* | (2006.01) |
| *G06F 1/32* | (2006.01) |
| *H04W 52/02* | (2009.01) |
| *G06F 3/041* | (2006.01) |

(52) U.S. Cl.
CPC .......... *G06F 1/3215* (2013.01); *G06F 1/3231* (2013.01); *G06F 3/041* (2013.01); *H04W 52/027* (2013.01); *Y02B 60/1289* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,108,028 | A | 8/2000 | Skarbo et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |

(Continued)

FOREIGN PATENT DOCUMENTS

| | | |
|---|---|---|
| EP | 2 081 113 A2 | 7/2009 |
| EP | 2 081 113 A3 | 7/2009 |

(Continued)

OTHER PUBLICATIONS

Final Office Action mailed Nov. 23, 2012, for U.S. Appl. No. 12/852,056, filed Aug. 6, 2010, 13 pages.

(Continued)

*Primary Examiner* — Gregory A Kessler
(74) *Attorney, Agent, or Firm* — Morrison & Foerster LLP

(57) ABSTRACT

An electronic device is disclosed. The electronic device includes a first input device; a second input device capable of operating in a first operating mode; and a system management module in communication with the first input device and the second input device. The system management module is configured for switching the second input device to a second operating mode in response to detecting, by the first input device, a presence of a user without receiving any operation-specific input from the user.

19 Claims, 6 Drawing Sheets

(56) References Cited

U.S. PATENT DOCUMENTS

| | | |
|---|---|---|
| 6,384,852 B1 | 5/2002 | Ye et al. |
| 6,690,387 B2 | 2/2004 | Zimmerman et al. |
| 7,015,894 B2 | 3/2006 | Morohoshi |
| 7,016,705 B2 | 3/2006 | Bahl et al. |
| 7,184,064 B2 | 2/2007 | Zimmerman et al. |
| 7,663,607 B2 | 2/2010 | Hotelling et al. |
| 7,752,623 B1 * | 7/2010 | Crawford, Jr. .......... G06F 9/505 718/1 |
| 8,479,122 B2 | 7/2013 | Hotelling et al. |
| 2003/0085870 A1 | 5/2003 | Hinckley |
| 2004/0163003 A1 | 8/2004 | Dutton et al. |
| 2006/0101293 A1 | 5/2006 | Chandley et al. |
| 2006/0174201 A1 * | 8/2006 | Zaner-Godsey ........ H04L 67/24 715/736 |
| 2006/0197753 A1 | 9/2006 | Hotelling |
| 2007/0054651 A1 | 3/2007 | Farmer et al. |
| 2007/0085157 A1 | 4/2007 | Fadell et al. |
| 2007/0100480 A1 | 5/2007 | Sinclair et al. |
| 2007/0288779 A1 | 12/2007 | Kim |
| 2008/0158172 A1 | 7/2008 | Hotelling et al. |
| 2008/0204359 A1 | 8/2008 | Tsui et al. |
| 2008/0297487 A1 | 12/2008 | Hotelling et al. |
| 2009/0019448 A1 * | 1/2009 | Bouge .................. G06F 9/5016 718/104 |
| 2009/0048709 A1 | 2/2009 | DeLine |
| 2009/0140863 A1 | 6/2009 | Liu et al. |
| 2009/0322683 A1 | 12/2009 | Tsuji et al. |
| 2010/0079508 A1 | 4/2010 | Hodge et al. |
| 2010/0134423 A1 | 6/2010 | Brisebois et al. |
| 2010/0138680 A1 | 6/2010 | Brisebois et al. |
| 2010/0153553 A1 * | 6/2010 | Sheth ................. H04L 67/1095 709/226 |
| 2010/0156790 A1 | 6/2010 | Su et al. |
| 2010/0164887 A1 | 7/2010 | Nakamura |
| 2011/0163976 A1 | 7/2011 | Barnhoefer et al. |
| 2012/0032894 A1 | 2/2012 | Parivar et al. |

FOREIGN PATENT DOCUMENTS

| | | |
|---|---|---|
| GB | 2 346 500 A | 8/2000 |
| JP | 2000-163031 A | 6/2000 |
| JP | 2002-342033 A | 11/2002 |
| TW | 200 919 281 A | 5/2009 |
| WO | WO-2009/062176 | 5/2009 |
| WO | WO-2009/096643 A1 | 8/2009 |
| WO | WO-2010/051001 A1 | 5/2010 |
| WO | WO-2012/019153 A1 | 2/2012 |

OTHER PUBLICATIONS

Final Office Action mailed Apr. 8, 2014, for U.S. Appl. No. 12/852,056, filed Aug. 6, 2010, 13 pages.

International Search Report mailed Dec. 2, 2011, for PCT Application No. PCT/US2011/046840, filed Aug. 5, 2011, seven pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final office Action mailed Jul. 6, 2012, for U.S. Appl. No. 12/852,056, filed Aug. 6, 2010, 14 pages.

Non-Final office Action mailed Oct. 18, 2013, for U.S. Appl. No. 12/852,056, filed Aug. 6, 2010, 14 pages.

Non-Final office Action mailed Aug. 25, 2014, for U.S. Appl. No. 12/852,056, filed Aug. 6, 2010, 14 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

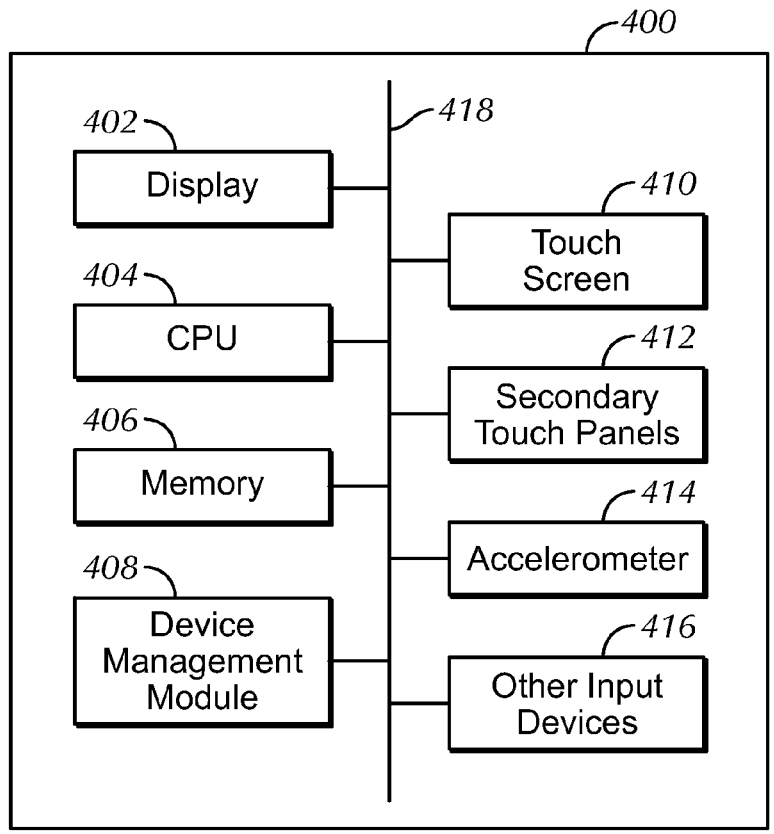
FIG. 4
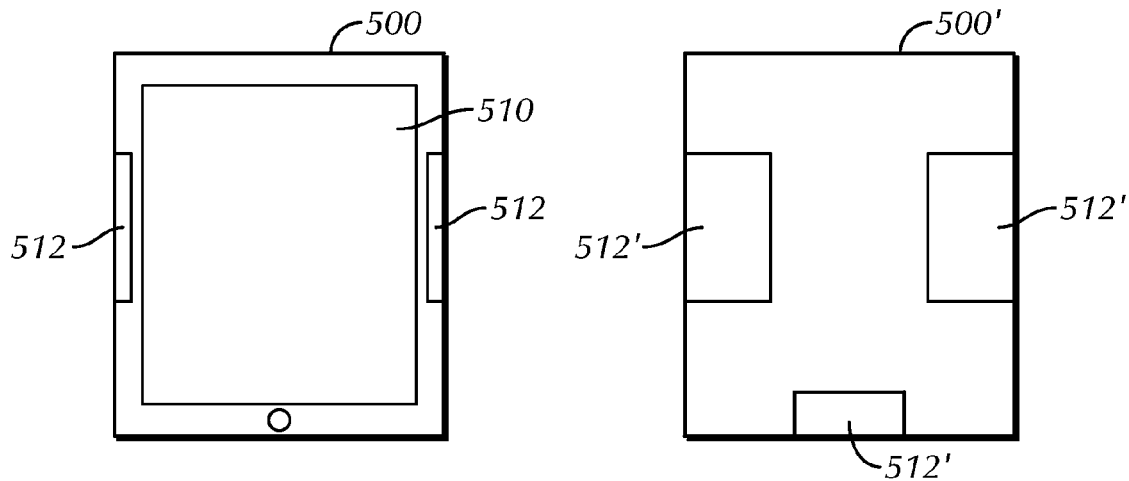
FIG. 5A  FIG. 5B

INTELLIGENT MANAGEMENT FOR AN ELECTRONIC DEVICE

FIELD

This relates generally to managing the operating mode of an electronic device, and more specifically, to detecting user presence and/or behavior using one or more sensors of an electronic device and managing the operating mode of the device based on the detected user presence and/or behavior.

BACKGROUND

Many modern electronic devices are designed to automatically adjust their operating mode based on the presence or absence of user activities detected by the devices. For example, a computer may dim its screen, display a screensaver, or switch to a sleep/low power mode if no user activity is detected for a predetermined period of time. This can be done using an internal timer which tracks the duration of the idle state of the computer. Conversely, a user-initiated input event such as a movement of the mouse, a stroke on the keyboard, or a gesture detected on a touch pad may cause the computer to switch back to a full operating mode and be responsive to the various user inputs.

However, this timer-based management system is not flawless. For example, this type of system assumes that the system can switch to a power-saving mode when no user interaction is detected via the system's input devices. That may not be true, for example, when a user is reading from a device with a large screen that can display large amount of content without requiring the user to scroll up and down frequently. Another example is when a user is watching a movie on a handheld device. In this case, although the user is not actively interacting with the device (e.g., typing or moving the cursor around), the device should preferably remain in normal operation mode. If the device automatically displays a screen saver, dims the screen, or goes into sleep mode based on the idle-duration timer, it may become an inconvenience for the user who has to make some type of input every so often to switch the device back to its normal operating mode so that he can resume watching the movie.

In addition, existing device management systems are designed to manage the operating mode of the device as a whole, but not the operating mode of the individual component or applications running on the device. That is, there are often only a limited number of operating modes available for a particular device. For example, a desktop computer may only have four different operating modes: a normal mode, screensaver mode, sleep mode (i.e., low-power mode), and off mode. A handheld device such as a MP3 player or a cellular phone may have a normal mode, a dim mode (i.e., low-power mode), and an off mode. There is typically one setting for each of the available modes in terms of which components of the device are left on and which ones can be turned off. As a result, it is difficult to achieve optimal efficiency given the limited number of operating modes available.

As electronic devices become more and more sophisticated, they may include more hardware components such as a touch pad, touch screen, accelerometer, camera, etc, each of which can be a source of power consumption. Similarly, multiple software applications can run on a device and demand limited system resources such as memory and processor power at the same time. Thus, an internal management system that can intelligently manage the device at a component level and/or application level based on user presence and behavior is highly desirable.

SUMMARY

This generally relates to detecting a user's presence and/or behavior using one or more sensors of an electronic device, and managing the operating mode of the device at a component/application level based on the detected presence and/or behavior to improve usability and efficiency of the device.

To prevent unwanted interruptions that can be detrimental to user experience, a device management module of an electronic device can be programmed to detect the presence of a user even in the absence of any operation-specific user input. In various embodiments, this can be achieved using one or more sensors of the same or different types embedded in the one or more input devices.

For example, the device management module can use both an idle-duration timer and non-operation-specific proximity data from the input devices to determine whether to switch the device to a different operation mode. The device can start off operating in a normal operating mode which requires at least most of the components of the device to be powered up and fully operational. If the device has not been idle for more than a predetermined period of time, the device management module can take no actions and keep the device in its normal operating mode. If the device management module determines that the device has been idle for more than the predetermined period of time, it can then check to see if proximity data is being received by any of the input devices. Because the system is in an idle state, the received proximity data can be interpreted as a continued presence of the user even though no substantive input from the user is being received. Thus, the device management module can again maintain the normal operating mode of the system. In contrast, if none of the input devices senses a touch, the device management module can then switch the system to a power-saving mode, a screen saver mode, some other mode or even a shutdown mode because it may be unlikely that the user is still present and actively engaged in the use of the system.

In another embodiment, the device management module can do more than maintaining or switching the operating mode of the device based on the presence or the lack of proximity data while the system is idle. The device management module can also manage the mode of individual components of the system and/or the status of one or more applications running on the system. In another embodiment, the device management module can also manage the allocation of system resources among multiple applications running on the system.

BRIEF DESCRIPTION OF THE DRAWINGS

FIG. 4 illustrates the exemplary components of a tablet personal computer (PC) including a device management module according to embodiments of the disclosure.

FIGS. 5a and 5b are the front and back view of an embodiment of the tablet PC of FIG. 4 according to embodiments of the disclosure.

DETAILED DESCRIPTION

In the following description, reference is made to the accompanying drawings which form a part hereof, and in which it is shown by way of illustration specific embodiments in which the disclosure can be practiced. It is to be understood that other embodiments can be used and structural changes can be made without departing from the scope of the embodiments of this disclosure.

This generally relates to detecting a user's presence and/or behavior using one or more sensors of an electronic device, and managing the operating mode of the device at a component/application level based on the detected presence and/or behavior to improve usability and efficiency of the device.

Figure 1:
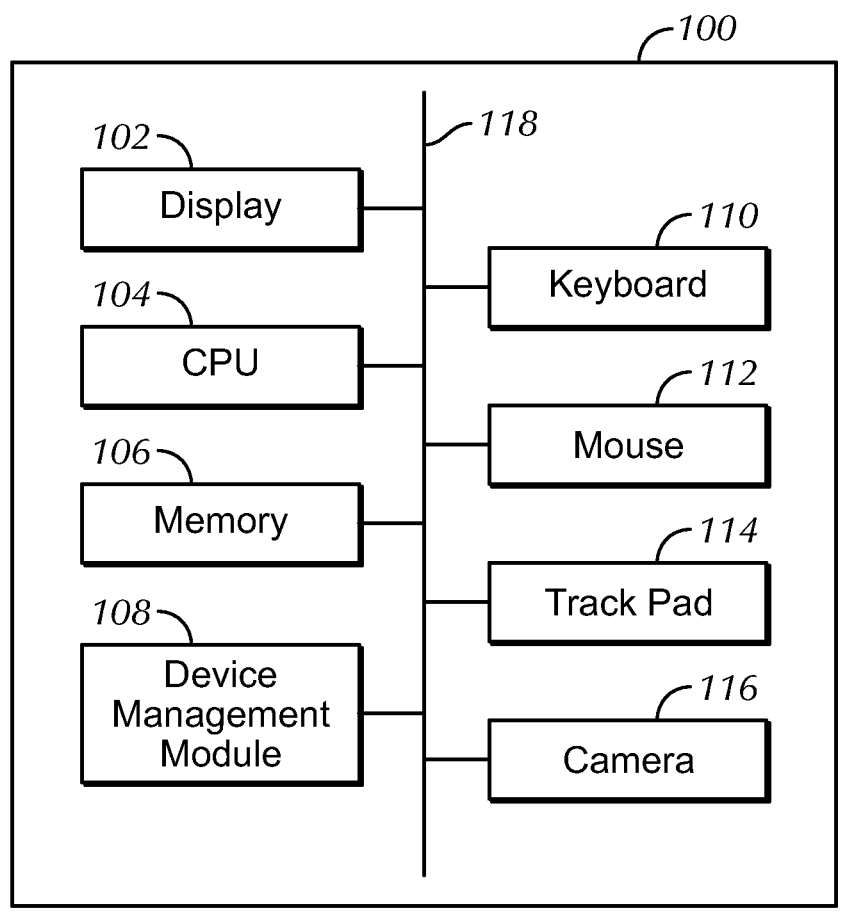
FIG. 1 illustrates the exemplary components of a computer system including a device management module according to embodiments of the disclosure.

In one embodiment, the electronic device can be a desktop or laptop computer system. As illustrated in FIG. 1, the computer system 100 can include a display 102, a central processing unit (CPU) 104, a memory 106, a device management module 108, one or more input devices such as a keyboard 110, mouse 112, trackpad 114, and camera 116, all in communication with each other via, for example, internal buses, external wires, wireless protocols, or any other means known in the art 118. Although the keyboard, mouse, and track pad are all shown in FIG. 1, it should be understood that a particular desktop or laptop may not be equipped with all three. A desktop or laptop computer system can also include input devices other than the three shown in FIG. 1. A user can interact with the computer system 100 via each of the input devices. Typically, as mentioned above, if the computer system 100 receives no user input from any of its input devices for a certain period of time, the device management module may switch the system 100 from a full operating mode to a power-saving mode. This may not be ideal if the user is in fact still reading an article or watching a movie from the display 102 or generally being attentive to the system, even though no operation-specific input such as a mouse click or a gesture on the trackpad is being received from the user.

To prevent unwanted interruptions that can be detrimental to user experience, the device management module 108 can be programmed to detect the presence of a user even in the absence of any operation-specific user input. In various embodiments, this can be achieved using one or more sensors of the same or different types embedded in the one or more input devices.

Figure 2A:
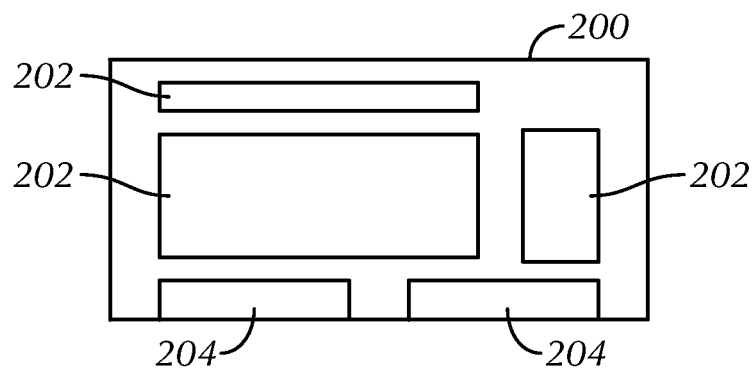
FIG. 2a illustrates a keyboard including at least one touch panel adapted to detect a user touch according to embodiments of the disclosure.
Figure 2B:
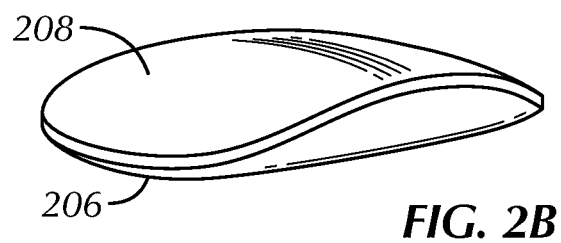
FIG. 2b illustrates a mouse including a touch surface adapted to detect a user touch according to embodiments of the disclosure.
Figure 2C:
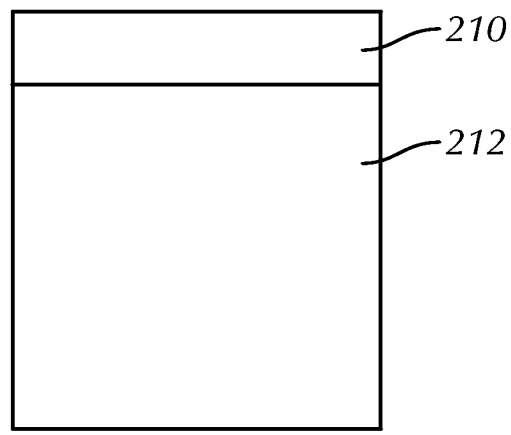
FIG. 2c illustrates a trackpad including a touch surface adapted to detect a user touch according to embodiments of the disclosure.

One type of sensor that can be found in many electronic devices today is a touch sensor. For example, touch sensors can be incorporated into input devices such as touchpads, touch screens, keyboards (e.g., FingerWorks' Touchstream keyboard), mice (e.g., the Apple Magic Mouse), and trackpads (e.g., the Apple Magic Trackpad). FIGS. 2a-c illustrate an exemplary touch-based keyboard, mouse, and trackpad, respectively. The keyboard 200 of FIG. 2a can include touch sensors at the palm-resting location 204. The keys 202 of the keyboard 200 can also include touch sensors. Accordingly, the keyboard 200 can detect touches and/or hovering (near-touches) (collectively, proximity detection) by a user's fingers and/or palms even when the user is just resting his hands on or over the keyboard without pressing any keys or making any meaningful inputs.

The mouse 206 of FIG. 2b can similarly include touch sensors overlapping at least part of its surface to form a touch surface 208. The touch surface 208 can allow a user to perform various simple and complicated gestures as input to the system. When the user is simply resting his hand over the mouse (e.g., holding the mouse) or making minor negligible movements without performing any gestures or other meaningful input, the touch surface can still capture the resulting touch data.

FIG. 2c illustrates a touch-based trackpad 210 including a similar touch surface 212 capable of detecting touches and/or near-touches and gestures from a user. The user can also rest or hover his fingers or other parts of his hands on the touch surface 212. The touch or near-touch by the user's resting fingers or hand can be captured without generating any meaningful input to the system to which the trackpad 210 is connected.

Referring back to FIG. 1, the keyboard 110, mouse 112, and trackpad 114 of the computer system 100 can be the touch-based keyboard 200, mouse 206, and trackpad 210 of FIGS. 2a-c, respectively. In addition, the display 102 can be a touch screen. The device management module can utilize the proximity data received from any of the keyboard 110, mouse 112, track pad 114, and the touch screen of the display 102 to determine whether a user is present even when the proximity data does not correspond to any meaningful input (i.e., input that can trigger a specific operation to be performed). If it is determined that the user is present based on the fact that the touch surface of any of these input devices 102, 110, 112, 114 indicates the detection a touch or near-touch, the device management module 108 can maintain the current operating mode of the computer system by simply taking no actions and postponing the activation of the screen saver or power-saving mode or other mode. This can provide a more seamless user experience for the user who may be reading or watching a movie from the display 110 and resting his hands on one of the touch-based input devices 102, 110, 112, 114.

Figure 3:
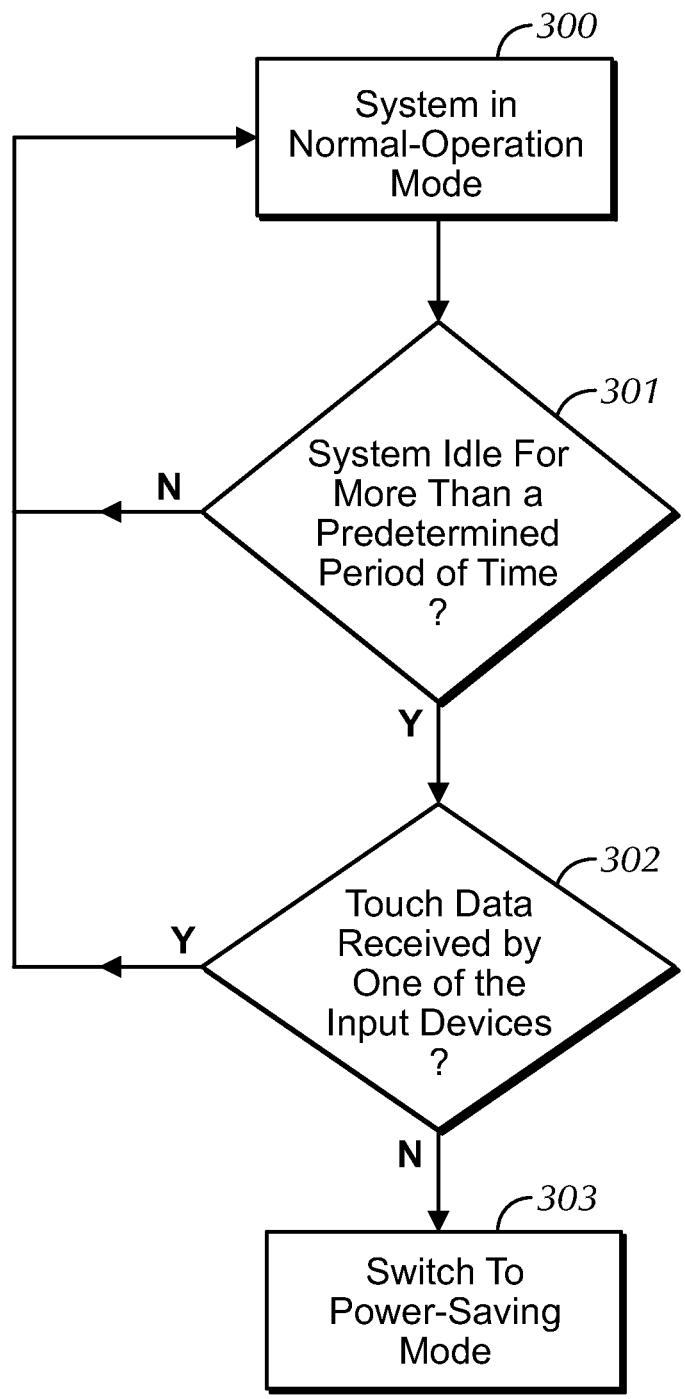
FIG. 3 is a flow chart illustrating exemplary steps in a process to manage the operating model of a device according to embodiments of the disclosure.

FIG. 3 illustrates the steps of an exemplary process that can be carried out by the device management module 108 to manage the operating mode of the device 100. In this example, the device management module 108 can use both an idle-duration timer and non-operation-specific proximity data from the input devices to determine whether to switch the device to a different operation mode. As illustrated, the device can start off operating in a normal operating mode which requires at least most of the components of the device to be powered up and fully operational (step 300). If the device has not been idle for more than a predetermined period of time, the device management module can take no actions and keep the device in its normal operating mode (step 301). If the device management module determines that the device has been idle for more than the predetermined period of time, it can then check to see if proximity data is being received by any of the input devices (step 302). Because the system is in an idle state, the received proximity data can be interpreted as a continued presence of the user even though no substantive input from the user is being received. Thus, the device management module can again maintain the normal operating mode of the system. In contrast, if none of the input devices senses a touch, the device management module can then switch the system to a power-saving mode, a screen saver mode, some other mode or even a shutdown mode because it may be unlikely that the user is still present and actively engaged in the use of the system (step 303).

To more accurately determine if a user is indeed present, other types of sensors such as the camera 116 of FIG. 1 can also collect data regarding the user's presence. The image data captured by the camera can supplement the proximity data collected by the touch-based input devices, or vice versa, to verify the user's presence. Thus, embodiments of the disclosure can utilize the proximity data to better manage the operating mode of the device to provide an improved experience for the user.

In another embodiment, the device management module can do more than maintaining or switching the operating mode of the device based on the presence or the lack of proximity data while the system is idle. The device management module can also manage the mode of individual components of the system and/or the status of one or more applications running on the system. For example, if the keyboard 110 of the computer system 100 of FIG. 1 detects proximity data reflecting that the user has both of his hands resting on the palm rest of the keyboard, the device management module 108 can remotely turn off the mouse 112 and/or the trackpad 114 (or switch them to a low-power mode) because when the user has both hands resting on the keyboard, it is highly unlikely that the mouse and/or the track pad would also be in use at the same time. Similarly, if the user is holding the mouse 112 or resting his hand on the trackpad 114, the device management module 108 can turn off the keyboard 110. By managing the operating mode of each individual component, such as the keyboard 110, mouse 112, and trackpad 114, the device management module 108 can reduce the overall power consumption by the system without negatively affecting the usability of the system.

In another embodiment, the device management module 108 can also manage the allocation of system resources among multiple applications running on the system 100. For example, if one of the applications is a word processor application but there is no touch or near-touch detected by the keyboard 110, the mouse 112, and the trackpad 114, the device management module 108 can temporarily suspend the word processor application by, for example, moving it to the background behind other applications or minimizing it so that more screen space on the display can be allocated to other applications. Alternatively or additionally, the device management module 108 can devote less CPU cycles and/or memory to the word processor application. The extra resources can be given to other applications running on the system. If a touch is detected on the keyboard or the mouse, the word processor application can automatically be reactivated or moved to the foreground. Other types of applications can be managed similarly to increase the efficiency of the overall computer system. As another example, a game application may be suspended if none of the devices being used to play the game is receiving any user input or even detecting the presence of a user.

The concept disclosed in the embodiment above with respect to a desktop or laptop computer system can also be applied to other electronic devices such as the tablet PC of FIG. 4. FIG. 4 illustrates various example components of tablet PC 400 including a display 402, CPU 404, memory 406, device management module 408, touch screen 410, one or more secondary proximity sensors or panels 412 having one or more touch and/or near-touch sensors, accelerometer 414, and other input devices 416, all in communication with each other via, for example, internal buses, external wires, wireless protocols, or any other means known in the art 418. Although the touch screen 410, secondary touch and/or near-touch sensors or panels 412, accelerometer 414, and other input devices 416 are all shown in FIG. 1, it should be understood that a particular tablet PC may not be equipped with all these components.

Typically, if the touch screen 410 does not detect any touch input from a user for a certain period of time, the tablet PC 400 can enter a dim mode in which the backlight of the display 402 is dimmed to reduce power consumption by the display 402. Alternatively or additionally, the entire device can be switched to a low-power mode such as a sleep mode or an off mode if the touch screen does not receive any input from the user. However, as previously discussed, the absence of any touch or near-touch on the touch screen 410, which can be the main input device of the tablet PC 400, does not necessarily mean that the user is no longer using the tablet PC 400. He or she may still be reading or watching a movie from the display. According to the same concepts disclosed in the embodiments above, other types of user input can be used to determine whether a user is still present but simply not interacting with the touch screen 410.

FIGS. 5a and 5b illustrate an exemplary embodiment of the tablet PC which includes one or more secondary touch and/or near-touch sensors or panels in addition to the main touch screen interface. FIG. 5a illustrates the front view of the exemplary tablet PC 500. The secondary touch and/or near-touch sensor or panel 512 can be placed along both edges of the tablet PC 500 where a user is most likely to be holding the device 500. Although not shown in FIG. 5a, additional or alternative touch and/or near-touch sensors or panels can also be incorporated, for example, along the top and bottom edges of the device to detect a user holding the tablet PC in a landscape orientation.

FIG. 5b provides a rear view of the same exemplary tablet PC 500. As shown, additional or alternative secondary touch and/or near-touch sensors or panels 512' can also be placed on the backside of the tablet PC 500 at locations which would allow detection of a user holding the tablet PC 500. In other embodiments, the secondary touch and/or near-touch sensors or panels can wrap around the side of the tablet PC 500 so long as a user touch or near-touch can be detected when the user is holding the device even though no input is being entered via the touch screen 510. In one embodiment, the secondary touch and/or near touch sensors or panels 512, 512' of FIGS. 5a and 5b can have less touch and/or near-touch resolution or capability then the touch screen 510 because all that the secondary touch panels 512, 512' are needed for is to detect user's hands holding the tablet PC 500 without further recognizing any particular movement or gesture.

Referring back to FIG. 4, the exemplary secondary touch and/or near-touch sensors or panels 412 of tablet PC 400 can be those shown in FIGS. 5a and 5b. Accordingly, the device management module 408 can determine based on proximity data received from the secondary touch and/or near-touch panels 412 whether the user is holding the tablet PC 400. If so, the device management module 408 can prevent the tablet PC 400 to be switched into a dim mode or any power-saving mode or other mode even though user input has not been detected on the touch screen 410 for a period of time. However, if no touch and/or near-touch is detected by either the touch screen 410 or the secondary touch and/or near-touch sensors or panels 412 for a predetermined period of time, the device management module 408 can then switch the device into a lower power or off mode to conserve battery. Other types of input devices such as the accelerometer 414 can also assist in determining whether a user is present and using the device.

In addition, the device management module 408 can also manage the operating mode of individual components and/or applications of the tablet PC 400. For example, if the only user input is being detected by the secondary touch and/or near-touch sensors or panels 412 at both edges of tablet PC 400, the touch sensor panel of the touch screen 410 can then be turned off to conserve battery power because the proximity data from the secondary touch panels 412 can be interpreted as indicating that the tablet PC 400 is being held by the user with both of his/her hands. Other components such as the wireless antenna (not shown), which is also likely not being used when the user is holding the tablet PC with both of his hands, can also be turned off. As another example, if the accelerometer 414 detects movement of the tablet PC 400, the secondary touch and/or near-touch sensors or panels 414 can be switched off because the movement alone can be sufficient enough to show that the user is actively using the device. Similarly, the accelerometer 414 can be turned off if the secondary touch and/or near-touch sensors or panels detect no touches by the user—indicating that the device is not being held by the user. By managing the operating mode of individual components, the device management module 408 can reduce power consumption by those components not in use and thus allow the device to have a longer battery life.

The device management module 408 can similarly manage the applications running on the tablet PC 400. For example, if the secondary touch and/or near-touch sensors or panels 412 detect that the user is holding the tablet PC 400 with both of his hands, any type of virtual input graphic user interface (GUI) such as a virtual keyboard or a virtual scroll wheel being displayed on the display 402 can be hidden. As soon as the touch or near-touch is no longer detected by at least one of the secondary touch and/or near-touch sensors or panels 412, the virtual keyboard or virtual scroll wheel can reappear on the display 418 so that the user can manipulate them using the touch screen 410. Again, these methods for intelligently managing the applications may improve user experience significantly.

Figure 6A:
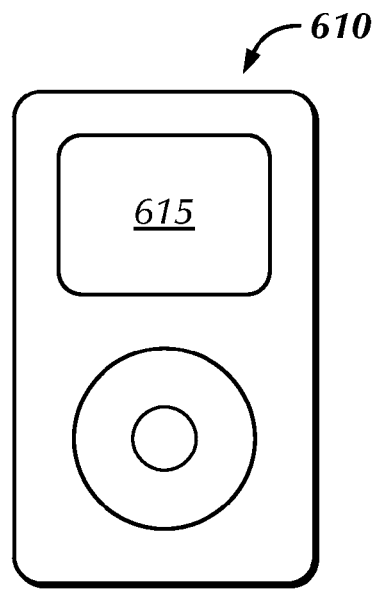
FIG. 6a illustrates an exemplary digital media player that can incorporate device management according to embodiments of the disclosure.
Figure 6B:
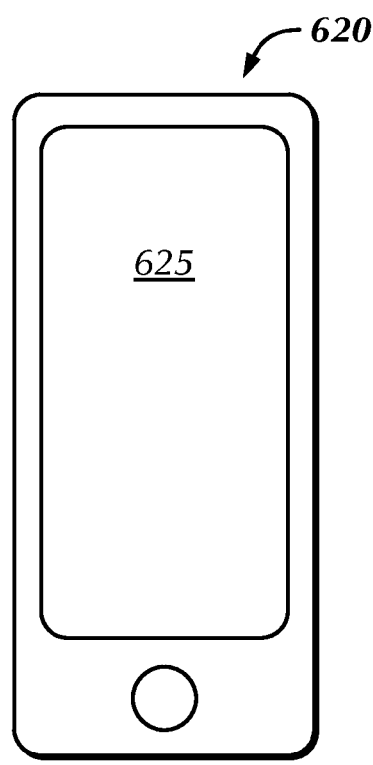
FIG. 6b illustrates an exemplary mobile telephone that can incorporate device management according to embodiments of the disclosure.

Although FIGS. 4, 5a and 5b illustrates a tablet PC, similar features disclosed in the embodiments above can be easily incorporated into other types of handheld electronic devices such as MP3 players and cellular phones to achieve the same goal. For example, FIG. 6A illustrates exemplary digital media player 610 that can include device management according to embodiments of the disclosure. FIG. 6B illustrates exemplary mobile telephone 620 that can include device management according to embodiments of the disclosure.

In fact, the disclosed concept of managing operating mode of a device at a component and/or application level can be useful to any electronic devices capable of detecting user presence and/or behavior to improve usability and efficiency of the device and reduce power consumption.

The device management module of the above-disclosed embodiments can be implemented in hardware, firmware, software, or a combination of any of the three. For example, the device management module can be implemented in firmware stored in memory and executed by a processor The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

The various operating modes of a device or components of a device can include, but is not limited to, a full operating mode in which the device (or component) can be in a full power mode, an idle mode in which some of the components of the device may not operating at normal speed, a sleep mode in which the device can be set to power-saving mode in which all but the most essential components can be turned off; and a power-down mode in which the device can be essentially turned-off completely. In other embodiments, the different modes can dictate processor speed and the allocation of other resource distribution of the device among the various components and applications.

Figure 7:
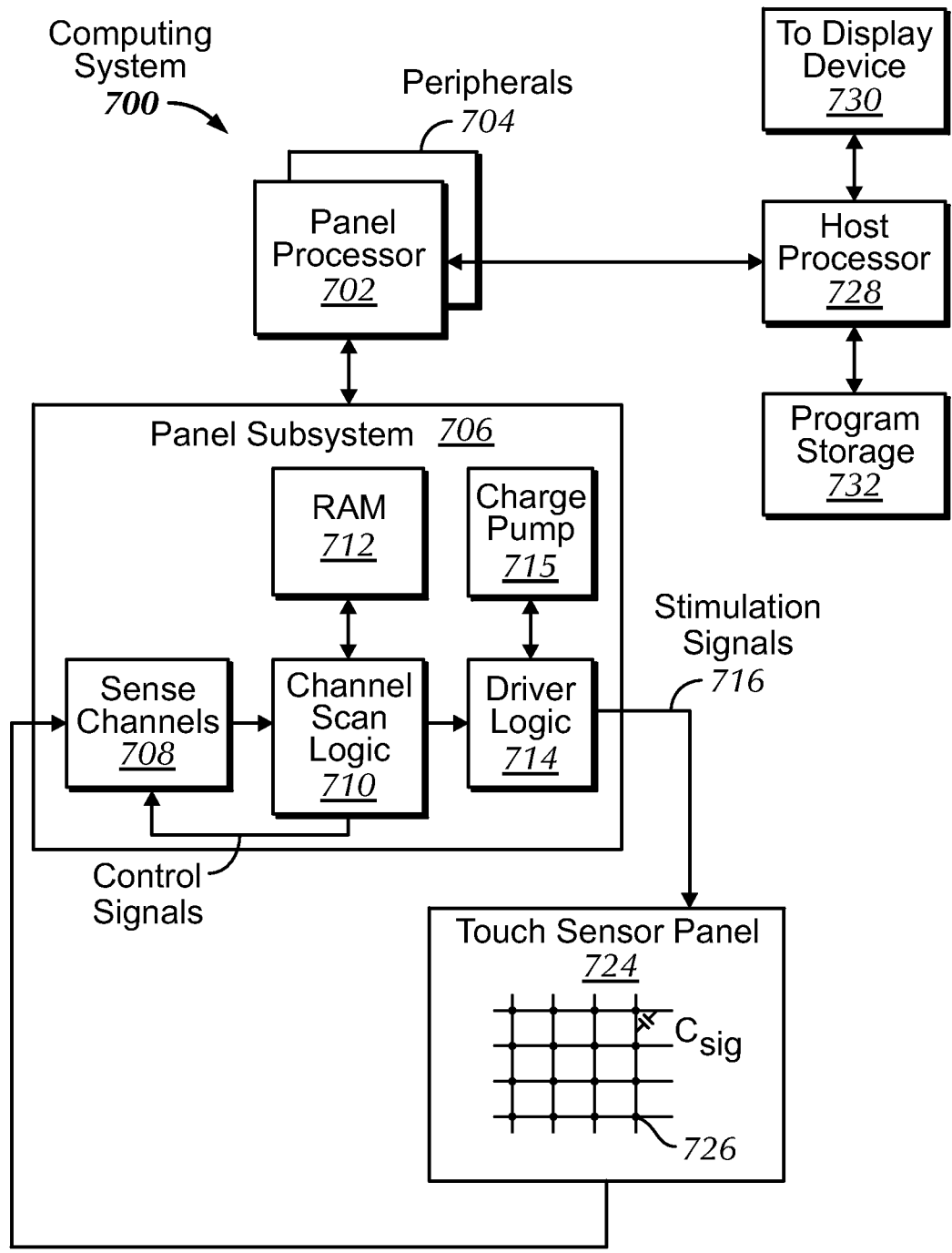
FIG. 7 illustrates an exemplary computing system that can incorporate device management according to embodiments of the disclosure.

As described above, touch-based input devices such as touch screens and touch panels can be one type of device used for determining user presence and behavior. These touch-based input devices can use any existing touch technologies including, but not limited to, capacitive, resistive, in infrared and acoustic touch technologies. FIG. 7 illustrates exemplary computing system 700 according to embodiments of the disclosure. The system 700 can include one or more touch sensor panels according to the embodiments of the disclosure described above. Computing system 700 can include one or more panel processors 702 and peripherals 704, and panel subsystem 706. Peripherals 704 can include, but are not limited to, random access memory (RAM) or other types of memory or storage, watchdog timers and the like. Panel subsystem 706 can include, but is not limited to, one or more sense channels 708, channel scan logic 710 and driver logic 714. Channel scan logic 710 can access RAM 712, autonomously read data from the sense channels and provide control for the sense channels. In addition, channel scan logic 710 can control driver logic 714 to generate stimulation signals 716 at various frequencies and phases that can be selectively applied to drive lines of touch sensor panel 724. In some embodiments, panel subsystem 706, panel processor 702 and peripherals 704 can be integrated into a single application specific integrated circuit (ASIC).

Touch sensor panel 724 can include a capacitive sensing medium having a plurality of drive lines and a plurality of sense lines, although other sensing media can also be used. Either or both of the drive and sense lines can be coupled to a thin glass sheet according to embodiments of the disclosure. Each intersection of drive and sense lines can represent a capacitive sensing node and can be viewed as picture element (pixel) 726, which can be particularly useful when touch sensor panel 724 is viewed as capturing an "image" of touch. (In other words, after panel subsystem 706 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 724 can drive sense channel 708 (also referred to herein as an event detection and demodulation circuit) in panel subsystem 706.

Computing system 700 can also include host processor 728 for receiving outputs from panel processor 702 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to panel processing, and can be coupled to program storage 732 and display device 730 such as an LCD panel for providing a UI to a user of the device. Display device 730 together with touch sensor panel 724, when located partially or entirely under the touch sensor panel, can form touch screen 718.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A method for managing an application running on an electronic device, comprising:
   detecting an interaction between a user and the device;
   determining whether a first application is in an idle mode in response to the detected interaction between the user and the device, wherein the detected interaction is unrelated to the first application;
   suspending the first application if the first application is determined to be in the idle mode;
   determining whether a second application different from the first application is in a normal mode in response to the detected interaction between the user and the device; and
   running the second application in the normal mode.

2. The method of claim 1, wherein suspending the first application comprises allocating fewer resources of the electronic device to the first application.

3. The method of claim 2, wherein the resources of the electronic device comprise an area of a display of the electronic device.

4. The method of claim 1, wherein determining whether the first application is in an idle mode further comprises determining whether the user is likely to interact with the first application with the detected interaction between the user and the device based on a detected type of the detected interaction.

5. A non-transitory computer-readable medium storing instructions for performing a method for managing an application running on an electronic device, the method comprising:
   detecting an interaction between the user and the device;
   determining whether a first application is in an idle mode in response to the detected interaction between the user and the device, wherein the detected interaction is unrelated to the first application;
   suspending the first application if the first application is determined to be in the idle mode;
   determining whether a second application different from the first application is in a normal mode in response to the detected interaction between the user and the device; and
   running the second application in the normal mode.

6. The computer-readable medium of claim 5, wherein suspending the first application comprises allocating fewer resources of the electronic device to the first application.

7. The non-transitory computer-readable medium of claim 6, wherein the resources of the electronic device comprise an area of a display of the electronic device.

8. The non-transitory computer-readable medium of claim 5, wherein determining whether the first application is in an idle mode further comprises determining whether the user is likely to interact with the first application with the detected interaction between the user and the device based on a detected type of the detected interaction between the user and the device.

9. An electronic device comprising:
   a processor configured to run one or more applications on the electronic device;
   a first input device configured to detect user input; and
   a device management module configured to allocate system resources of the electronic device to the one or more applications based on whether or not user input is detected by the first input device using a method comprising:
      determining whether a first application is in an idle mode in response to the user input detected by the first input device, wherein the user input detected by the first input device is unrelated to the first application;
      suspending the first application if the first application is determined to be in the idle mode;

determining whether a second application different from the first application is in a normal mode in response to the user input detected by the first input device; and running the second application in the normal mode.

10. The electronic device of claim 9, wherein the device management module is configured to reduce an amount of system resources allocated to the second application when no user input is detected by the first input device.

11. The electronic device of claim 10, wherein reducing an amount of system resources to the second application comprises suspending the application or minimizing the application.

12. The electronic device of claim 10, further comprising a display, wherein the system resources comprise an area of the display occupied by the one or more applications.

13. The electronic device of claim 9, wherein the device management module is configured to increase an amount of system resources allocated to the second application when user input is detected by the first input device.

14. The electronic device of claim 13, wherein increasing the amount of system resources allocated to the second application comprises moving the second application to a foreground of a display or increasing processor or memory resources to the second application.

15. The electronic device of claim 9, wherein the first input device comprises at least one of a keyboard, mouse, touch panel, proximity sensor, and camera.

16. The electronic device of claim 9, wherein the first input device comprises a touch-sensing keyboard, and wherein the device management module increases an amount of system resources to the second application in response to detecting a touch on the keyboard based on a determination that the second application is configured to receive input from the keyboard.

17. The electronic device of claim 9, wherein the second application comprises a video game, and wherein the device management module suspends the game when no user input is detected by the first input device.

18. The electronic device of claim 10, wherein the system resources comprises at least one of processor cycles and memory.

19. The electronic device of claim 9, wherein the user input is a first user input, and the electronic device further comprises:

a second input device different from the first input device, the second input device configured to detect a second user input, wherein the device management module is further configured to, in response to receiving the second user input:

determine whether the first application is in the normal mode in response to the second user input detected by the second input device;

run the first application in the normal mode;

determine whether the second application is in the idle mode in response to the second user input detected by the second user input device, wherein the second user input detected by the first input device is unrelated to the second application; and suspending the second application if the second application is determined to be in the idle mode.

* * * * *